(12) United States Patent
Seo

(10) Patent No.: US 7,444,895 B2
(45) Date of Patent: Nov. 4, 2008

(54) DOUBLE CLUTCH TRANSMISSION

(75) Inventor: Jin Beom Seo, Suwon (KR)

(73) Assignee: Hyundai Motor Company, Seoul (KR)

( * ) Notice: Subject to any disclaimer, the term of this patent is extended or adjusted under 35 U.S.C. 154(b) by 211 days.

(21) Appl. No.: 11/641,403

(22) Filed: Dec. 19, 2006

(65) Prior Publication Data

US 2008/0098838 A1 May 1, 2008

(30) Foreign Application Priority Data

Oct. 31, 2006 (KR) .................. 10-2006-0106646

(51) Int. Cl.
- *F16H 3/08* (2006.01)
- *F16H 3/38* (2006.01)
- *F16C 15/00* (2006.01)

(52) U.S. Cl. ..................... 74/331; 340/572.2

(58) Field of Classification Search .............. 74/329, 74/330, 331, 340, 572.2; 192/110 R
See application file for complete search history.

(56) References Cited

U.S. PATENT DOCUMENTS

| | | | |
|---|---|---|---|
| 3,949,556 A * | 4/1976 | Wallis | 60/709 |
| 4,727,764 A * | 3/1988 | Klaue | 74/331 |
| 2004/0060378 A1 * | 4/2004 | Yamamoto et al. | 74/335 |
| 2004/0200300 A1 * | 10/2004 | Ahrens | 74/331 |
| 2006/0163019 A1 * | 7/2006 | Feldhaus et al. | 192/48.8 |
| 2006/0196751 A1 * | 9/2006 | Schneider et al. | 192/213 |
| 2006/0225527 A1 * | 10/2006 | Yang et al. | 74/330 |

* cited by examiner

*Primary Examiner*—Roger Pang
(74) *Attorney, Agent, or Firm*—Morgan Lewis & Bockius LLP

(57) ABSTRACT

A double clutch transmission includes a first input shaft receiving power from a crankshaft through a first clutch and comprising at least one first drive gear, a second input shaft receiving power from a crankshaft through a second clutch and comprising at least one second drive gear, a first output shaft comprising at least one first driven gear to receive the power from the second input shaft, a second output shaft comprising at least one second driven gear to receive the power from the first input shaft, and a flywheel interposed between the first clutch and the second clutch wherein a bearing supporting the flywheel is disposed on an exterior circumference of the second input shaft.

6 Claims, 1 Drawing Sheet

DOUBLE CLUTCH TRANSMISSION

CROSS-REFERENCE TO RELATED APPLICATION

This application claims priority to and the benefit of Korean Patent Application No. 10-2006-0106646 filed in the Korean Intellectual Property Office on Oct. 31, 2006, the entire contents of which are incorporated herein by reference.

TECHNICAL FIELD OF THE INVENTION

Generally, the present invention relates to a double clutch transmission. More particularly, the present invention relates to a double clutch transmission with improved durability and performance and noise reduction.

BACKGROUND OF THE INVENTION

Typically, a double clutch transmission receives power from an engine through two clutches and two shafts. That is, the double clutch transmission includes two input shafts and two output shafts. The power is input to each input shaft from the engine through the two clutches, respectively, and each input shaft includes a plurality of drive gears, and each output shaft includes a plurality of driven gears.

A plurality of synchronizers are disposed to each output shaft and rotation speeds of the output shaft and the input shaft are synchronized therethrough. However, according to the double clutch transmission of the prior art, problems such as noise occur in a part of the input shaft to which a flywheel is connected and durability is deteriorated. In addition, durability of the input shaft is deteriorated and noise occurs in the input shaft because an imbalance often occurs in the two input shaft.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a double clutch transmission having the advantages of improving durability and performance and reducing noise. An exemplary embodiment of the present invention provides a double clutch transmission including a first input shaft receiving power from a crankshaft through a first clutch and at least one first drive gear. The double clutch transmission also includes a second input shaft receiving power from a crankshaft through a second clutch and at least one second drive gear. Also included is a first output shaft having at least one first driven gear to receive power from the second input shaft, a second output shaft including at least one second driven gear to receive the power from the first input shaft, and a flywheel interposed between the first clutch and the second clutch wherein a bearing supporting the flywheel is disposed on an exterior circumference of the second input shaft. In some embodiments, the bearing can be a ball bearing. In other embodiments, a bearing is interposed between the first input shaft and the second input shaft. In other embodiments, the bearing can be a needle bearing. In some embodiments, a bearing is disposed to one end of the first input shaft. In other embodiments, the bearing can be a pilot bearing.

DETAILED DESCRIPTION OF THE EMBODIMENTS

Figure 1:
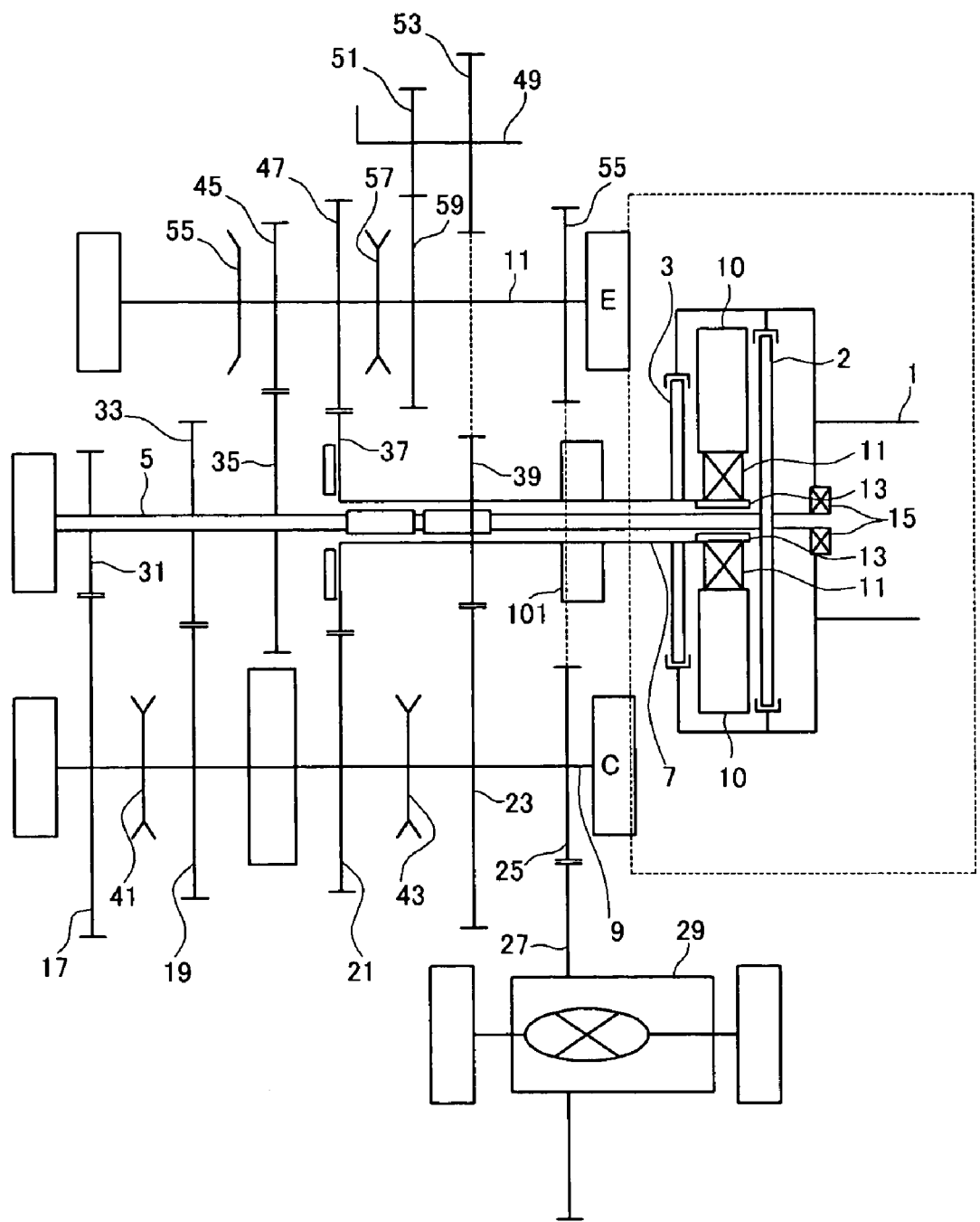
FIG. 1 is a schematic diagram showing a double clutch transmission according to an exemplary embodiment of the present invention.

Referring to FIG. 1, a double clutch transmission includes a first input shaft 5, second input shaft 7, first output shaft 9, and second output shaft 11. The first input shaft 5 receives power from a crankshaft 1 through the first clutch 2 and includes at least one first drive gears 31 and 33 and the second input shaft 7 receives the power from the crankshaft 1 through the second clutch 3 and includes at least one second drive gears 37 and 39.

The first output shaft 9 includes at least one the first driven gears 17, 19, 21, and 23 to receive power from the first and the second input shafts 5 and 7 and the second output shaft 11 includes at least one of the second driven gear 45, 47, and 59 to receive the power from the first and the second input shafts 5 and 7. The flywheels 10 are interposed between the first clutch 2 and the second clutch 3, to maintain rotational inertia of the crankshaft 1. Bearings 11 supporting the flywheel 10 are disposed on an exterior circumference of the second input shaft 7 and, in some embodiments, bearing 11 can be realized as a ball bearing. That is, the power generated in the engine is input to the first input shaft 5 and the second input shaft 7 through the crankshaft 1, the first clutch 2, and the second clutch 3.

The first input shaft 5 is disposed to transmit power to gears utilized to odd number shift speeds and the second input shaft 7 is disposed to transmit the power to gears utilized to even number shift speeds. That is, the first drive gears 31, 33, and 35 disposed to the first input shaft 5 includes a first forward speed drive gear 31, a third forward speed drive gear, 33 and the fifth forward speed drive gear 35. In addition, the second drive gear 37 and 39 disposed to the second input shaft 7 includes a second forward speed drive gear 39 and a fourth forward speed drive gear 37.

A first forward speed driven gear 17, a second forward speed driven gear 23, a third forward speed driven gear 19, and a fourth forward speed driven gear 21 are disposed to the first output shaft 9 and a fifth forward speed driven gear 45, a sixth forward speed driven gear 47, and a reverse speed drive gear 59 are disposed to the second output shaft 11. A reverse speed idle shaft 49 is disposed on an upper portion of the second output shaft 11 in the drawing and is operated by a reverse speed driven gear 51.

A first and a third forward speed synchronizer 41 and a second and a fourth forward speed synchronizer 43 are disposed to the first output shaft 9 and a fifth forward speed synchronizer 55 and a sixth forward speed and reverse speed synchronizer 57 are disposed to the second output shaft 11. If the first output shaft 9 is connected by which one of the first forward speed to the fourth forward speed synchronizers 41 and 43 is connected to one of the first forward speed to the fourth forward speed driven gears 17, 19, 21, and 23, the power is transmitted from the first output shaft 9 to the first output gear 25. Then, the power is transmitted to the differential apparatus 29 through a ring gear 27 engaged with the first output gear 25.

Similarly, the power is transmitted to the second output shaft 11 if one of the fifth forward speed and the sixth forward speed synchronizers 55 and 57 is connected to one of the fifth forward speed and the sixth forward speed driven gears 45 and 47. In addition, if the reverse speed synchronizer 57 is connected to reverse speed drive gear 59, the reverse speed driven gear 51, the reverse speed idle shaft 49, and the reverse speed idle driven gear 53 are sequentially driven. Then, the power is transmitted to the differential apparatus 29 through the second forward speed drive gear 39, the first input shaft 5, and the first output gear 25. Therefore, the reverse speed is realized.

The second output shaft 11 includes a second output gear 55 and the power shifted by the fifth forward speed and the sixth forward speed driven gears 45 and 47 is transmitted to the first output gear 25 through the second output gear 55. Because the synchronizers 41, 43, 55, and 57 are obvious to a person of an ordinary skill in the art, the detailed descriptions thereof are omitted herein. The ball bearing 11 is mounted for supporting the flywheel 10 and durability of the clutch system disposed to a left and a right sides of the flywheel 10 can be improved. In addition, a bearing 13 is interposed between the first input shaft 5 and the second input shaft 7 and the bearing 13 can be realized as a needle bearing.

If the second input shaft 7 rotates at a high speed, the main bearing 101 supporting the second input shaft 7 may be broken by an imbalance of the input shafts 5 and 7 and if the imbalance is serious, even the input shafts 5 and 7 may be broken. However, because the above described breakage can be prevented by the needle bearing 13, durability of the transmission can be improved by the needle bearing 13. Another bearing 15 can be disposed to an one end of the first input shaft 5 and the bearing 15 can be realized as a pilot bearing. Because the first input shaft 5 is supported by the pilot bearing 15, the durability of the transmission can be improved and rattle and noise can be prevented.

According to an exemplary embodiment of the present invention, rattle and noise can be prevented and durability of a double clutch transmission can be improved. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A double clutch transmission comprising:
   a first input shaft receiving power from a crankshaft through a first clutch and comprising at least one first drive gear;
   a second input shaft receiving power from a crankshaft through a second clutch and comprising at least one second drive gear;
   a first output shaft comprising at least one first driven gear to receive the power from the second input shaft;
   a second output shaft comprising at least one second driven gear to receive the power from the first input shaft; and
   a flywheel interposed between the first clutch and the second clutch;
   wherein a bearing supporting the flywheel is disposed on an exterior circumference of the second input shaft.

2. The double clutch transmission of claim 1, wherein the bearing, comprises a ball bearing.

3. The double clutch transmission of claim 1, wherein a second bearing is interposed between the first input shaft and the second input shaft.

4. The double clutch transmission of claim 3, wherein the second bearing comprises a needle bearing.

5. The double clutch transmission of claim 1, wherein a second bearing is disposed to one end of the first input shaft.

6. The double clutch transmission of claim 5, wherein the second bearing comprises a pilot bearing.

* * * * *